US006966525B1

(12) United States Patent
Schroeder

(10) Patent No.: US 6,966,525 B1
(45) Date of Patent: Nov. 22, 2005

(54) IN-FLIGHT REFUELING SYSTEM, ALIGNMENT SYSTEM, AND METHOD FOR AUTOMATIC ALIGNMENT AND ENGAGEMENT OF AN IN-FLIGHT REFUELING BOOM

(75) Inventor: Steven B. Schroeder, Derby, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/880,171

(22) Filed: Jun. 28, 2004

(51) Int. Cl.[7] ................................................ B64C 1/00
(52) U.S. Cl. .................................. 244/135 A; 244/136
(58) Field of Search ....................... 244/135 R, 135 A, 244/135 B

(56) References Cited

U.S. PATENT DOCUMENTS 3,917,196 A * 11/1975 Pond et al. .................. 342/23
4,025,193 A * 5/1977 Pond et al. .................. 356/5.1
4,158,885 A * 6/1979 Neuberger .................. 701/300
4,170,773 A * 10/1979 Fitzsimmons et al. ........ 342/42
4,231,536 A * 11/1980 Ishimitsu et al. ....... 244/135 A
4,398,685 A * 8/1983 Task et al. ............. 244/135 A
4,540,144 A * 9/1985 Perrella ................. 244/135 A
4,586,683 A * 5/1986 Kerker .................. 244/135 A
5,131,438 A * 7/1992 Loucks ......................... 141/1
5,326,052 A * 7/1994 Krispin et al. .......... 244/135 A
5,493,392 A * 2/1996 Blackmon et al. ..... 356/139.03
5,499,784 A * 3/1996 Crabere et al. ......... 244/135 A
5,530,650 A * 6/1996 Biferno et al. ............. 701/300
6,324,295 B1 * 11/2001 Valery et al. .............. 382/100
6,669,145 B1 * 12/2003 Green .................... 244/135 A
6,752,357 B2 * 6/2004 Thal et al. .............. 244/135 A
6,837,462 B2 * 1/2005 von Thal et al. ........ 244/135 A
2003/0209633 A1 * 11/2003 Thal et al. ............. 244/135 A
2004/0069904 A1 * 4/2004 Thal et al. ............. 244/135 A

* cited by examiner

*Primary Examiner*—Michael J. Carone
*Assistant Examiner*—S. A. Holzen
(74) *Attorney, Agent, or Firm*—Alston & Bird LLP

(57) ABSTRACT

An in-flight refueling system, alignment system, and method are provided for substantially automating the positioning and engagement of an in-flight refueling system carried by a first aircraft with respect to a refueling receptacle carried by a second aircraft so as to facilitate an in-flight refueling operation between the first and the second aircraft. More specifically, the present invention provides for the alignment of the in-flight refueling boom with the refueling receptacle such that an extendable nozzle may extend from the in-flight refueling boom and engage the refueling receptacle to initiate an in-flight refueling operation.

13 Claims, 4 Drawing Sheets

IN-FLIGHT REFUELING SYSTEM, ALIGNMENT SYSTEM, AND METHOD FOR AUTOMATIC ALIGNMENT AND ENGAGEMENT OF AN IN-FLIGHT REFUELING BOOM

FIELD OF THE INVENTION

The present invention relates generally to in-flight refueling of a manned or unmanned aircraft using a boom in-flight refueling system, and specifically, providing optical and/or electronic alignment devices carried by first and/or second aircraft so as to provide guidance to a refueling boom carried by the first aircraft such that the refueling boom may automatically engage a refueling receptacle carried by the second aircraft as part of an in-flight refueling operation.

BACKGROUND OF THE INVENTION

In-flight refueling (or air-to-air refueling) is an important method for extending the range of both manned and unmanned aircraft traveling long distances over areas having no feasible landing or refueling points. Although in-flight refueling is a relatively common operation, especially for military aircraft, precise positioning of a second aircraft (the receiver aircraft, for example) with respect to a first aircraft (the tanker aircraft, for example) is required in order to provide a safe engagement of the first aircraft (and a refueling system carried thereby) with the second aircraft for the dispensing of fuel. The requirement of precise relative spatial positioning of two rapidly moving aircraft makes in-flight refueling a challenging operation.

One conventional system for in-flight refueling is the boom in-flight refueling system. The boom in-flight refueling system typically comprises a rigid boom carried by and lowered from a rear portion of a fuselage of a first aircraft. At one end of the boom is an extendable refueling nozzle and adjacent the extendable refueling nozzle are airfoils, which are controlled by an in-flight refueling system operator onboard the first aircraft. The airfoils provide maneuverability of the boom with respect to an aircraft that is to be refueled (the second aircraft) and allow the in-flight refueling operator to position the boom relative to the second aircraft. First, an operator of the second aircraft must maneuver the second aircraft to within an in-flight refueling position, below and aft of the first aircraft. Upon maneuvering into the in-flight refueling position, the in-flight refueling system operator controls the airfoils to position the boom such that the extendable refueling nozzle of the boom may extended into a refueling receptacle on the second aircraft. The in-flight refueling system operator is responsible for maintaining the position of the boom relative to the refueling receptacle as the refueling nozzle is extended towards the second aircraft. As both the first and second aircraft may be traveling at hundreds of miles per hour through areas of turbulence created both by atmospheric conditions and the aerodynamic forces of the control surfaces of the aircraft, the positioning and maintenance of boom position relative to the refueling receptacle may be extremely difficult. Furthermore, if the refueling nozzle is extended (typically at a rate of 1 to 4 feet per second) while the boom and refueling receptacle are out of alignment, the nozzle may impact the second aircraft at a position other than the in-flight refueling receptacle, thereby possibly causing serious damage the second aircraft and/or causing a serious mid-air accident.

Also, the in-flight refueling system operator (operator) may be responsible for performing a number of tasks other than controlling the boom for an in-flight refueling operation. For instance, the operator may also be tasked with monitoring the progress of several simultaneous in-flight refueling operations involving the first aircraft, such as in cases wherein the first aircraft is carrying multiple pod-mounted in-flight refueling systems and may be capable of refueling several other aircraft simultaneously. In addition, the operator may be tasked with monitoring fuel transfer, adjusting and maintaining a balanced fuel load onboard the first aircraft, monitoring the position of the second aircraft relative to the first aircraft during in-flight refueling operations so as to advise an operator of the first aircraft to avoid collisions and/or other safety hazards, and performing other tasks related to various in-flight refueling operations. These tasks may be complicated further when, for instance, the second aircraft is an unmanned aircraft such as a UAV, wherein an operator of the second aircraft may be non-existent and/or located remotely. In the case of UAV refueling, the in-flight refueling system operator must be especially vigilant for in-flight collisions while at the same time be able to maintain the position of the in-flight refueling boom in relative alignment with a refueling receptacle carried by an unmanned aircraft that may not be able to compensate quickly for turbulence and/or other anomalies that may typically complicate the in-flight refueling operation.

Thus, it would be advantageous to reduce the workload and/or number of tasks for the operator such that the operator may focus on safety issues and advising an operator of the first aircraft of the relative positions of the first and second aircraft during in-flight refueling operations. One possible method for reducing operator workload may include increasing the level of automation in the in-flight refueling operation, by, for instance, at least partially automating the positioning controls of the in-flight refueling system, such as, for instance, control of the airfoils used to position the in-flight refueling boom relative to the second aircraft. Some optical systems have been disclosed for positioning refueling drogues (in probe and drogue in-flight refueling systems) with respect to refueling probes attached to a second aircraft. As refueling drogues, however, have proven relatively unmaneuverable, these systems have not been operationally viable. One such optical system is described in U.S. Pat. No. 5,326,052 to Krispin et al. Other optical systems for positioning objects with respect to reflectors and retro-reflectors have not been easily adapted for use in all types of in-flight refueling systems. Furthermore, these systems do not address the possibility of automating the control of, for instance, a boom in-flight refueling system.

Therefore, there exists a need for an in-flight refueling system that provides an alignment device to align an in-flight refueling boom carried by a first aircraft with a refueling receptacle carried by a second aircraft. There also exists a need for a boom in-flight refueling system that is at least partially automated so as to reduce operator workload wherein the in-flight refueling system may automatically maneuver and maintain the position of an in-flight refueling boom and/or automatically engage an in-flight refueling boom with a refueling receptacle carried by a second aircraft. There also exists a need for an in-flight refueling system that may be capable of maintaining and/or "tracking" an alignment between an in-flight refueling boom and a refueling receptacle such that an extendable nozzle extending from the in-flight refueling boom may safely engage the refueling receptacle carried by a second aircraft.

SUMMARY OF THE INVENTION

The embodiments of the present invention satisfy the needs listed above and provide other advantages as described below. The present invention provides an in-flight refueling system, alignment system, and method adapted to facilitate the alignment of an in-flight refueling boom carried by a first aircraft with a refueling receptacle carried by a second aircraft such that an extendable nozzle may extend from the in-flight refueling boom to engage the refueling receptacle in order to conduct an in-flight refueling operation. The in-flight refueling system comprises an in-flight refueling boom adapted to be carried by a first aircraft wherein the in-flight refueling boom further comprises an extendable nozzle capable of extending therefrom. Furthermore, the extendable nozzle is adapted to engage a refueling receptacle carried by a second aircraft. The in-flight refueling system also comprises an alignment device operably engaged with the in-flight refueling boom and configured to determine and indicate alignment of the in-flight refueling boom with the refueling receptacle carried by the second aircraft such that the extendable nozzle can be extended to engage the refueling receptacle.

According to other embodiments, the in-flight refueling system and alignment system may also comprise a controller operably engaged with the in-flight refueling boom and in communication with the alignment device, such that the controller may be configured to position the in-flight refueling boom such that it is in alignment with the refueling receptacle. In addition the controller may be further configured to automatically extend the extendable nozzle to engage the refueling receptacle while the in-flight refueling boom is in alignment with the refueling receptacle. In other embodiments, the alignment device may further comprise an imaging device and/or a range-finder device configured to capture images of the refueling receptacle and determine the distance between the in-flight refueling boom and the refueling receptacle so as to facilitate the positioning and automatic engagement of the extendable nozzle with respect to the refueling receptacle. In other embodiments, the in-flight refueling system may further comprise a locator device configured to emit a signal that is receivable by the alignment device so as to indicate the alignment of the in-flight refueling boom with the refueling receptacle so as to facilitate the automated engagement of the extendable nozzle with the refueling nozzle.

The method of the present invention may also facilitate an in-flight refueling operation between a first aircraft adapted to carry an in-flight refueling boom having an extendable nozzle being capable of extending therefrom and a second aircraft carrying a refueling receptacle. According to one embodiment, the method comprises the steps of: determining that an extendable nozzle configured to extend from the in-flight refueling boom is in alignment with the refueling receptacle; and indicating that the extendable nozzle is in alignment with the refueling receptacle such that the subsequent extension of the extendable nozzle will engage the refueling receptacle. In some method embodiments, the indicating step may further comprise: emitting a signal from the second aircraft; and receiving the signal at the first aircraft, wherein the reception of the signal by the receiver device is indicative of alignment between the in-flight refueling boom and the refueling receptacle. Other method embodiments may further comprise positioning the in-flight refueling boom such that the in-flight refueling boom is in alignment with the refueling receptacle, and/or extending the extendable nozzle to engage the refueling receptacle while the in-flight refueling boom is in alignment with the refueling receptacle. According to other method embodiments, the method may further comprise capturing an image of the refueling receptacle; positioning of the in-flight refueling boom into alignment with the refueling receptacle at least partially based on the image; determining a distance between the in-flight refueling boom and the refueling receptacle; and extending the extendable nozzle to engage the refueling receptacle based at least partially on the distance between the in-flight refueling boom and the refueling receptacle.

Thus, the various embodiments of the in-flight refueling system, alignment system, and method of the present invention provide many advantages that may include, but are not limited to: the ability to provide a substantially automated alignment between an in-flight refueling boom carried by a first aircraft and a refueling receptacle carried by a second aircraft, the ability to detect and automatically maintain alignment between the in-flight refueling boom and the refueling receptacle, and the ability to automatically extend an extendable nozzle from the in-flight refueling boom to the refueling receptacle so as to initiate an in-flight refueling operation. These features may allow an operator of the in-flight refueling system to focus attention on safety and fuel management issues in relation to the in-flight refueling operation as the operator need only monitor the automated operation of the in-flight refueling system. The embodiments of the present invention may also be especially advantageous when used in in-flight refueling operations involving unmanned aircraft (UAV) since the in-flight refueling boom may be precisely controlled via the in-flight refueling system and alignment systems of the present invention. Thus, the in-flight refueling boom may be positioned to compensate for shifts in the spatial position of the UAV that may often occur because the UAV's operator is located remotely and thus may be unaware of slight changes in position relative to the first aircraft that may hamper the in-flight refueling operation.

These advantages and others that will be evident to those skilled in the art are provided in the in-flight refueling system, alignment system, and method of the present invention.

BRIEF DESCRIPTION OF THE DRAWINGS

Figure 1:
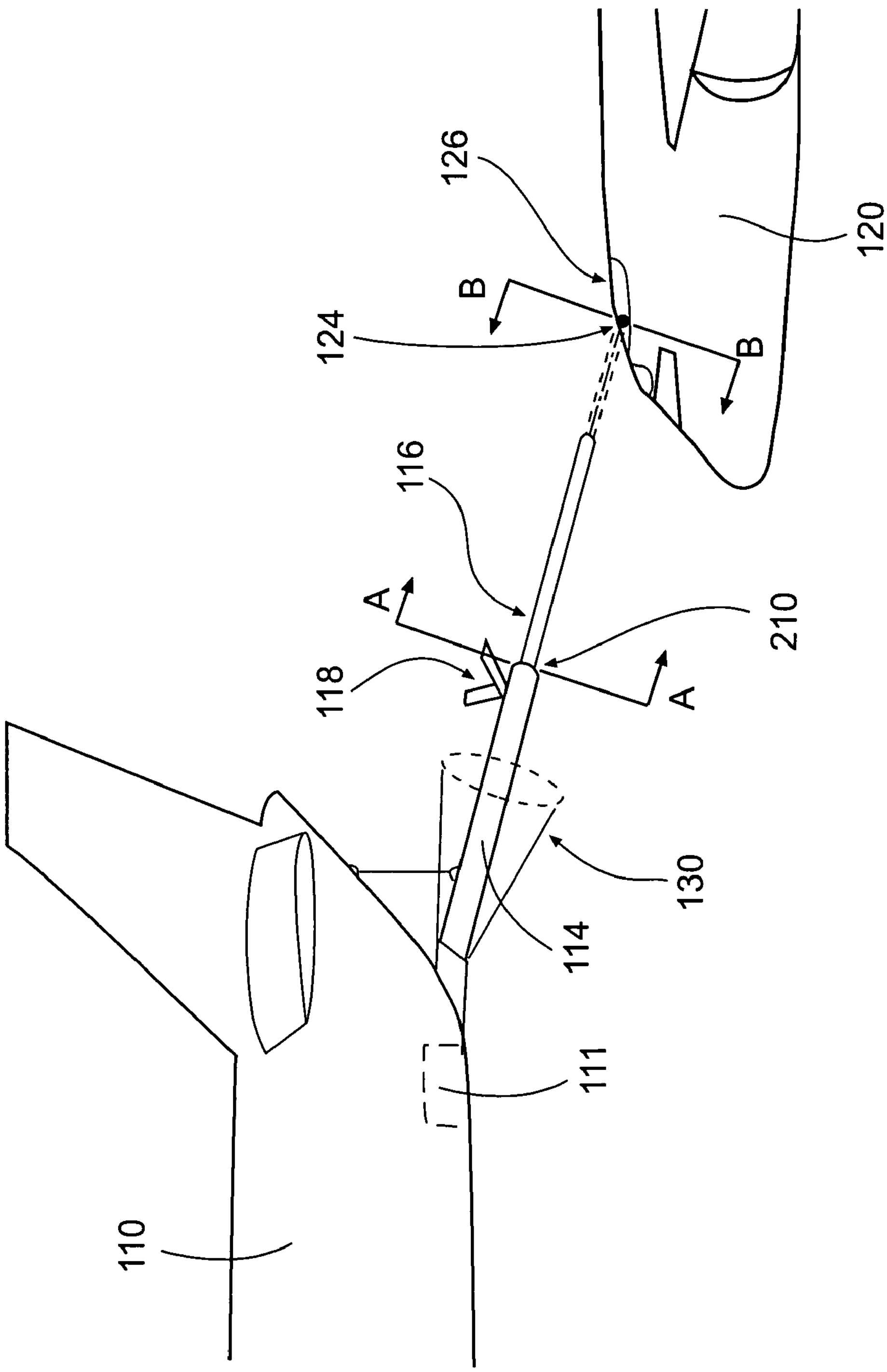
Figure 3:
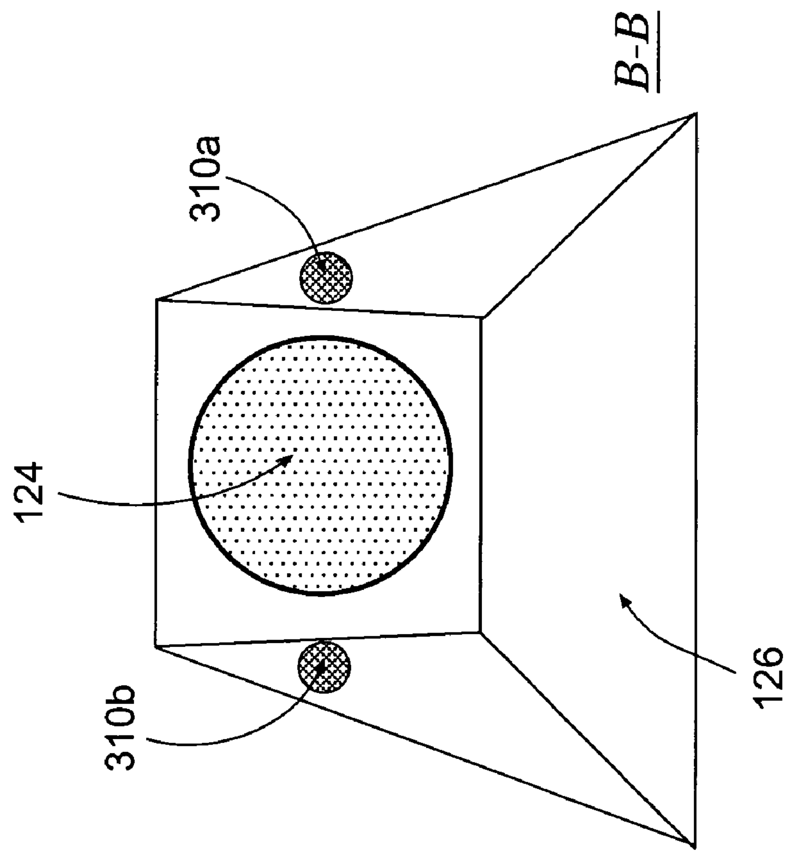
Figure 2:
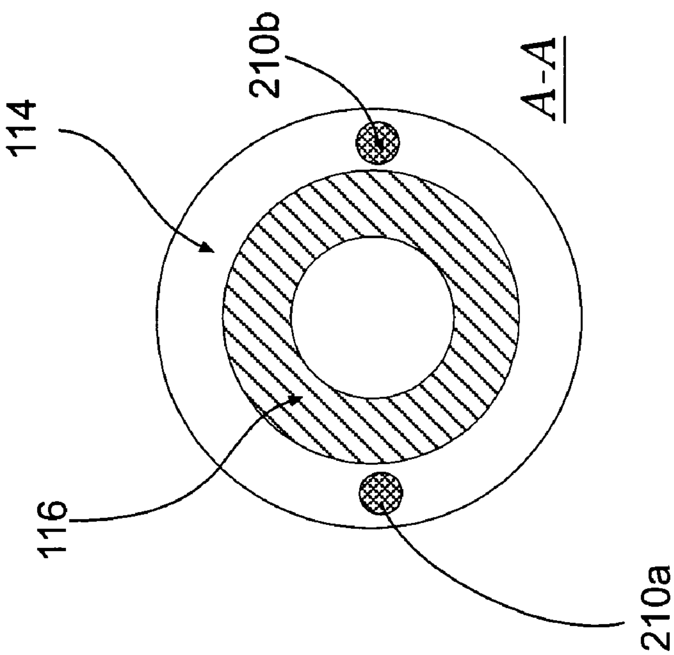
Figure 4:
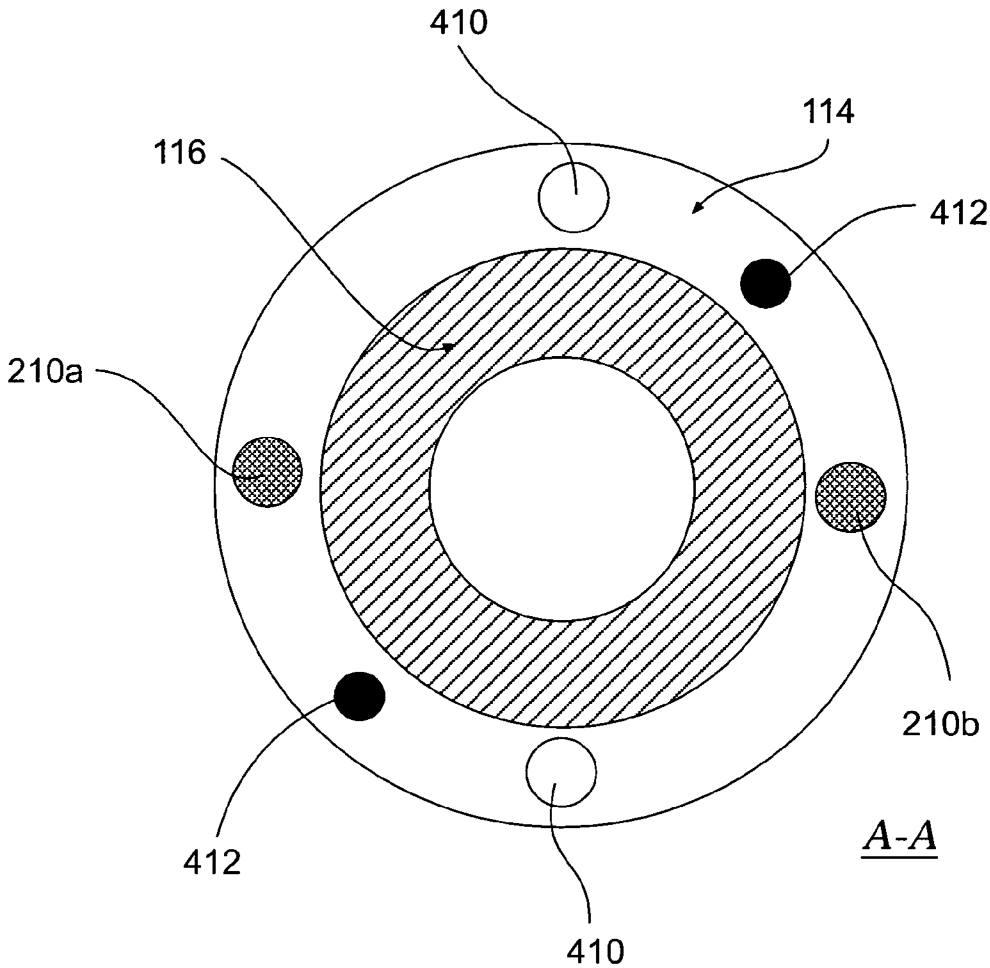
Figure 5:
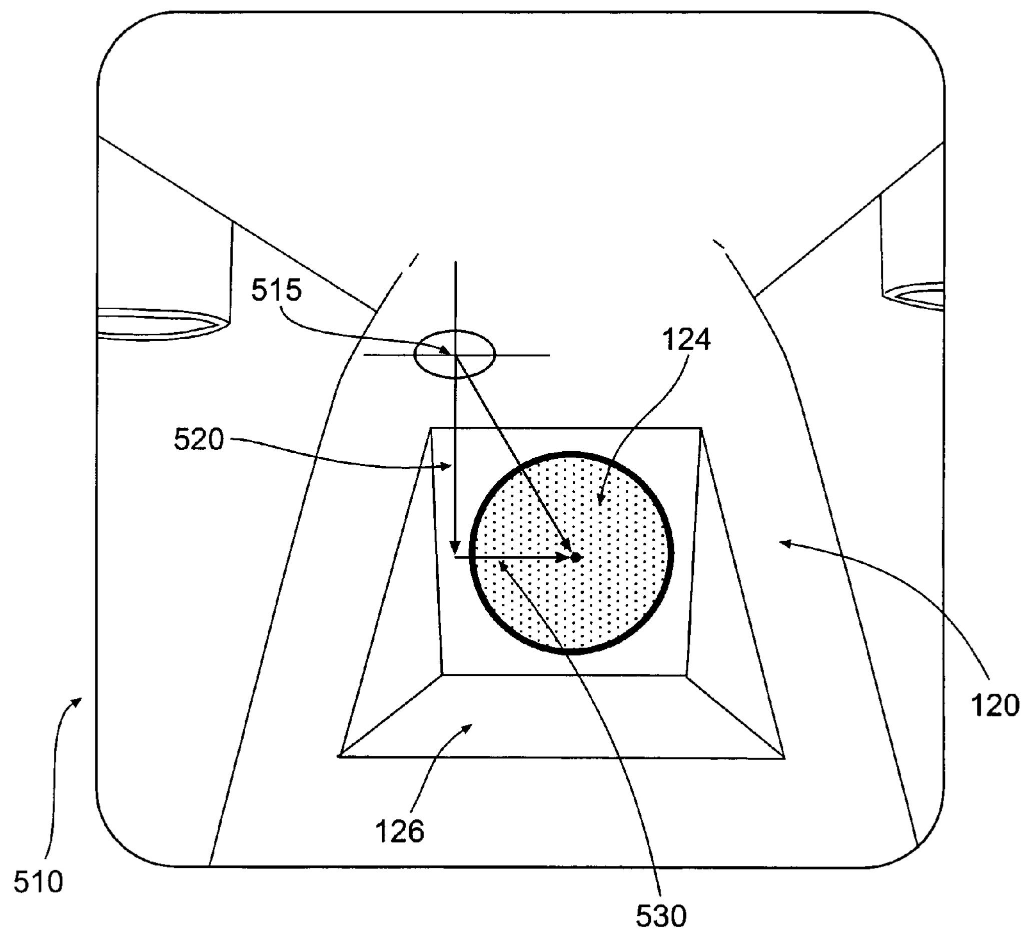

Having thus described the invention in general terms, reference will now be made to the accompanying drawings, which are not necessarily drawn to scale, and wherein:

FIG. 1 shows a side view of an in-flight refueling operation between a first aircraft carrying a boom in-flight refueling system and a second aircraft carrying a refueling receptacle;

FIG. 2 shows a cross sectional view of an end of a refueling boom including an alignment device according to one embodiment of the present invention, the cross sectional view corresponding to section A—A of FIG. 1;

FIG. 3 shows a cross sectional view of a refueling receptacle including a locator device according to one embodiment of the present invention, the cross sectional view corresponding to section B—B of FIG. 1;

FIG. 4 shows a cross sectional view of an end of a refueling boom including an alignment device, an imaging device and a range finder device according to one embodiment of the present invention, the cross sectional view corresponding to section A—A of FIG. 1; and FIG. 5 shows an image of a refueling receptacle carried by a second aircraft as viewed by an imaging device disposed on an end of an in-flight refueling boom according to one embodiment of the present invention, wherein the image may provide positioning vectors so as to position the in-flight refueling boom into substantial alignment with the refueling receptacle.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows an in-flight refueling operation between a first aircraft 110 and a second aircraft 120, wherein the first aircraft may be adapted to carry an in-flight refueling boom 114 as part of an in-flight refueling system, and the in-flight refueling boom 114 may be configured to be guided into alignment with a refueling receptacle 126 carried by the second aircraft 120. For instance, the refueling boom 114 may be guided into alignment with the refueling receptacle 126 by adjusting the airfoils 118 operably engaged with an end of the boom 114. According to one embodiment of the present invention, the refueling boom 114 (and airfoils 118 operably engaged therewith) may be controlled by, for instance, a controller 111. The controller 111 may further comprise one or more microprocessors (or other computer devices) and/or input and output devices such that an operator of the in-flight refueling system may monitor and/or override the operation of the controller 111 if required. The controller 111 may be in communication with the airfoils 111 via various devices and methods suitable for controlling the airfoils, including hydraulic lines, electro-mechanical devices and/or methods, as well as via electronic connections in communication with one or more electromechanical servo motors operably engaged with the airfoils 118.

According to one embodiment of the in-flight refueling system and alignment system of the present invention, the controller 111 may lower the in-flight refueling boom 114 to await the rendezvous of the second aircraft 120 with a position substantially aft and below the first aircraft 110. The controller 111 may, in some instances, be configured to control the airfoils 118 so as to maintain the position of the in-flight refueling boom 114 within a holding circle 130 relative to the first aircraft 110 while awaiting the approach of the second aircraft 120. An alignment device 210 (as described more fully below), operably engaged with the in-flight refueling boom 114 may be configured to determine and indicate alignment of the in-flight refueling boom 114 with the refueling receptacle 126 operably engaged with the second aircraft such that an extendable nozzle 116 may be extended telescopically from a stowed position within the in-flight refueling boom 114, to engage the refueling receptacle 126. As described more fully below, the alignment device 210 may be operably engaged with an end of the in-flight refueling boom 114 (as shown in FIG. 2) and configured to be in communication with the controller 111 such that the alignment device 210 may determine alignment of the in-flight refueling boom 114 with the refueling receptacle 126 and indicate the alignment to the controller 111 such that the controller 111 may extend the extendable nozzle 116 telescopically from the in-flight refueling boom 114 (as shown in FIG. 1) such that the extendable nozzle 116 may engage the refueling receptacle 126 and thereby transfer fuel through a fuel conduit defined concentrically within the extendable nozzle 116 to a refueling aperture 124 defined in the refueling receptacle 126 carried by the second aircraft 120.

FIG. 2 shows a cross section (corresponding to section A—A shown on FIG. 1) of the extendable nozzle 116 and an alignment device 210 disposed on an end of the in-flight refueling boom 114 wherein the alignment device 210 comprises, for instance, a pair of receiver devices 210*a*, 210*b* configured to receive, for instance, a signal (described more particularly below) emitted by a complementary pair of locator devices 310*a*, 310*b* (see FIG. 3) that may be disposed substantially adjacent to the refueling aperture 124 and generally carried by the refueling receptacle 126 of a second aircraft 120. The reception of the signal by the receiver devices 210*a*, 210*b* may thus be indicative of alignment between the in-flight refueling boom 114 and the refueling receptacle 126. According to some embodiments of the present invention, the alignment device 210 (such as, for example, the receiver devices 210*a*, 210*b*) may be configured to be in communication with the controller 111 so as to be responsive to the signal sent by the respective locator devices 310*a*, 310*b* by, for instance, directing the controller 110 to extend the extendable nozzle 116 to engage the refueling receptacle 126. For instance, upon receiving the signal, the receiver devices 210*a*, 210*b* may communicate with the controller 111 so as to instruct the controller 111 to extend the extendable nozzle 116 into engagement with the refueling receptacle 126. Further, according to some embodiments, if, during extension of the extendable nozzle 116 the signal is interrupted and/or no longer received by the receiver devices 210*a*, 210*b* prior to engagement with the refueling receptacle 126, the controller 111 may suspend the extension of the extendable nozzle 116 and/or automatically retract the extendable nozzle 116 in response to the loss of the signal. Thus, according to this embodiment, the in-flight refueling system and alignment system will only complete the extension and engagement of the extendable nozzle if the in-flight refueling boom 114 remains in alignment with the refueling receptacle 126 carried by the second aircraft 120.

As shown in FIG. 3, the locator devices 310*a*, 310*b* may be disposed substantially adjacent to the refueling aperture 124 so as to be configured to emit a signal along an axis of alignment such that if the complementary receiver devices 210*a*, 210*b* are capable of receiving the signal, then the in-flight refueling boom 114 is substantially aligned with the refueling receptacle 126 as shown generally in FIG. 1. The locator devices 310*a*, 310*b* may comprise, for instance, lasers, infra-red lighting units, visible lighting units, magnetic devices, and/or other devices suitable for emitting a signal that may be capable of being received by complementary receiver devices 210*a*, 210*b* operably engaged with an end of the in-flight refueling boom 114. According to some embodiments, the locator devices 310*a*, 310*b* may further be disposed remotely from the refueling aperture 124 and in communication, with, for instance, a transmitting device suitable for transmitting the signal therefrom such that the signal may be emitted from a position that is substantially adjacent to refueling aperture 124. For instance, the locator devices 310*a*, 310*b* may further comprise laser devices configured to emit a laser signal via, for instance, a fiber optic cable to, for instance, one or more lens devices disposed substantially adjacent to the refueling aperture 124 of the second aircraft 120 such that if the complementary receiver devices 210*a*, 210*b* are capable of receiving the signal, then the reception of the signal may be indicative that the in-flight refueling boom 114 is substantially aligned with the refueling receptacle 126 as shown generally in FIG. 1. Furthermore, the receiver devices 210*a*, 210*b* may comprise, for instance, optical sensors, transducers, magnetic devices, and/or other devices suitable for receiving a signal along an axis of alignment that may be produced by the locator devices 310*a*, 310*b* either disposed substantially adjacent to the refueling aperture 124 of the second aircraft 120 or configured to emit a signal from a position disposed substantially adjacent to the refueling aperture 124 of the second aircraft 120. According to other embodiments, the receiver devices 210*a*, 210*b* may be configured to be carried by the tanker aircraft 110 in various positions relative to complementary locator devices 310*a*, 310*b* configured to be carried by a receiver aircraft 120 such that the reception of a signal by the receiver devices 210*a*, 210*b* (from the corresponding locator devices 310*a*, 310*b*) is indicative of substantial alignment between the in-flight refueling boom 114 and the refueling receptacle 126. For instance, optic devices, mirrors, periscopes, and other devices may be used to indicate such substantial alignment even in some cases wherein the locator devices 310*a*, 310*b* may not be positioned in substantial alignment with receiver devices 210*a*, 210*b* as generally shown in FIG. 1.

As shown in FIG. 3, the refueling receptacle 126 may further comprise a Universal Air Refueling Slipway Installation (UARSI) that may further comprise a recessed refueling aperture 124 surrounded by structurally-reinforced inclined surfaces configured to guide the extendable nozzle 116 into engagement with the refueling aperture 124. Thus, in some embodiments, the locator devices 310*a*, 310*b* may be further configured to emit a signal adapted to be receivable by the complementary receiver devices 210*a*, 210*b* operably engaged with the in-flight refueling boom 114 so long as the in-flight refueling boom 114 is at least partially aligned with the refueling receptacle 126 (such as a UARSI) such that the extendable nozzle 116, if extended, would be guided into engagement with the refueling aperture 124 by, for instance, the inclined surfaces of the UARSI. One skilled in the art will appreciate that the refueling receptacle 126 carried by the second aircraft 120 may further comprise a cover device configured to cover the refueling receptacle 126 when not in use such that the refueling aperture 124 may be more fully sealed and such that the refueling receptacle 126 produces a minimum of additional drag and/or aerodynamic disturbances when not in use.

FIG. 4 shows a cross section (as indicated by section A—A shown in FIG. 1) of the extendable nozzle 116 and an alignment device 210 disposed on the end of the in-flight refueling boom 114 wherein the alignment device 210 comprises, as described above, a pair of receiver devices 210*a*, 210*b* configured to receive, for instance, a signal emitted by a pair of complementary locator devices 310*a*, 310*b* disposed substantially adjacent to a refueling aperture 124 defined in a refueling receptacle 126 carried by a second aircraft 120. However, the embodiment of the in-flight refueling system and alignment system shown in FIG. 4 further comprises at least one imaging device 410 and at least one range finder device 412 disposed on an end of the in-flight refueling boom 114 wherein both the imaging device 410 and the range finder device may be further configured to communicate with the controller 111 so as to facilitate the automatic alignment and/or engagement of the extendable nozzle 116 with the refueling aperture 124 defined in the refueling receptacle 126 carried by the second aircraft 120.

The imaging device 410 may comprise, for instance, one or more high-resolution cameras, carried by the in-flight refueling boom 114, such as by being mounted on an end of the in-flight refueling boom 114, as shown in FIG. 4, configured to capture an image (such as, for instance, a digitized raster image) of the refueling receptacle 126 carried by the second aircraft 120. According to some embodiments, the imaging device 410 may be further configured to be capable of focusing on a refueling receptacle 126 carried by a second aircraft 120 once the refueling receptacle 126 is within a predetermined distance, such as about 25 feet, of an end of the in-flight refueling boom 114 wherein the imaging device 410, alignment devices 210*a*, 210*b* and range finder devices 412 may be disposed. As such the imaging device may be capable of capturing an image of the refueling receptacle 126 even as the second aircraft is only approaching the first aircraft, and is not yet close enough to be engaged by the extendable nozzle 116 extending from the in-flight refueling boom 114, such as according to some embodiments where the maximum extension of the extendable nozzle 116 relative to the in-flight refueling boom 114 is about 19 feet. Additionally, the refueling receptacle 126 carried by the second aircraft 120, is in some embodiments, positioned in substantial alignment with the in-flight refueling boom 114 and about 6–10 feet from an end of the in-flight refueling boom 114 when the extendable nozzle 116 is extended therefrom in order to engage the refueling aperture 124 defined by the refueling receptacle 126. In addition, in some embodiments, the imaging device 410 may be further configured to have a field of view of a predetermined angular range, such as about eight degrees (four degrees up and down, and four degrees left and right) with respect to the in-flight refueling boom 114 carried by the tanker aircraft 110. Thus, in this embodiment, the field of view of the imaging device 410 combined with the range of motion of the in-flight refueling boom 114 within the holding circle 130 defined by the controller 111 (as shown in FIG. 1) may allow the imaging device 410 to search for and capture an image of the in-flight refueling receptacle 126 (or other unique known structure or device) carried by the second aircraft 120 even if the second aircraft may, in some instances, be approaching the first aircraft 110 (and the in-flight refueling boom 114 carried thereby) along a position that may not be directly aft and below the first aircraft 110. In order to "search" and/or "track" the refueling receptacle 126, the controller 111 may further comprise a memory device configured to store digitized images of a standard refueling receptacle as deployed on a number of types of aircraft. Thus, an operator of the system may choose the type of the second aircraft 120 such that the controller 111 may access (from the memory device) a digitized raster image of a reference refueling receptacle 126 and communicate with the imaging device 410 to scan its field of vision for a refueling receptacle 126 having an image similar to the digitized raster image pulled from the memory device. This feature of the controller 111 may further allow the imaging device 410 (in conjunction with the controller 111) to "track" the refueling receptacle 126 of the second aircraft 120 by, for instance, providing images to the controller 111 that may, in turn, reposition the in-flight refueling boom 114 such that the refueling receptacle 126 remains in view, so as to maintain substantial alignment of the in-flight refueling boom 114, with respect to the refueling receptacle 126 during the course of an in-flight refueling operation (as described more fully below). The controller 111 and imaging device 412 may be required to search for and/or track the refueling receptacle 126, for instance, in bad weather or in low-visibility conditions or wherein the second aircraft 120 is an unmanned aircraft (UAV) such that an operator of the second aircraft 120 is not present to make minute control corrections required to approach the first aircraft 110 from a position directly aft and below the first aircraft 110.

As described above with respect to FIG. 4, the in-flight refueling system and alignment system embodiments of the present invention may comprise an imaging device 410 disposed on an end of the in-flight refueling boom 114 so as to be configured to be capable of capturing an image (such as, for instance, a raster image) of the refueling receptacle 126 (such as, for instance, a UARSI) carried by a second aircraft 120. According to some embodiments, the imaging device 410 may be in communication with a controller 111 such that the imaging device may provide the image of the refueling receptacle 126 to the controller 111. According to some embodiments, as described above with respect to FIG. 1, the controller 111 may, in turn, be further configured to be capable of receiving the image and positioning the in-flight refueling boom 114 in response to the image and/or "track" the refueling receptacle 126 using the in-flight refueling boom 114, so as to align the in-flight refueling boom 114 with the refueling receptacle 126 (or more particularly, the refueling aperture 124 defined in the refueling receptacle 126).

For instance, FIG. 5 shows an image 510 according to one embodiment of the present invention that may be provided by the imaging device 410 of the present invention wherein the imaging device may capture an image 510 of the refueling device 126 carried by a second aircraft 120 as viewed from the imaging device 410 disposed on an end of the in-flight refueling boom 114. As described above, the image 510 may comprise multiple camera images, if for instance, the imaging device comprises one or more high resolution cameras operably engaged with an end of the in-flight refueling boom. As such, the image 510 provided by the imaging device 410 to the controller 111 may be, for instance, a composite raster image created by digitally combining the images provided by one or more high-resolution cameras to provide, for instance, a raster image, whereby vector coordinates 520, 530 may be produced by the controller 111 (or for instance, a computer program product suitable for producing vector coordinates by analyzing a raster image) such that the controller 111 may position the in-flight refueling boom 114 in response to the vector coordinates 520, 530 determined from the image 510, so as to align the in-flight refueling boom 114 with the refueling receptacle 126 and the refueling aperture 124 defined therein. For example, in FIG. 5, the center point 515 of the image 510 (and therefore, the center point 515 of the field of view of the imaging device 410) is shown as above and to the left of the refueling receptacle 126 carried by a second aircraft 120 approaching the first aircraft 110. According to some advantageous embodiments, the imaging device 410 is positioned and operably engaged with an end of the in-flight refueling boom 114 such that the center point 515 of the image 510 provided thereby substantially corresponds with an axis of alignment of the in-flight refueling boom 114 such that if the extendable nozzle 116 were extended telescopically from the in-flight refueling boom 114 an end of the extendable nozzle 116 would pass substantially through the point designated by the center point 515 of the image 510. In other embodiments, wherein the center point 515 of the image 510 may not substantially correspond with an axis of the in-flight refueling boom 114, the controller 111 may be further configured to compensate, for instance, for the position of the center point 515 of the image 510 relative to the axis of the in-flight refueling boom 114 so as to produce, for instance, positioning vectors 520,530 suitable for substantially aligning the in-flight refueling boom 114 with a refueling probe 126 carried by a second aircraft 120. In addition, the controller 111, using an image 510 provided by, for instance, an imaging device 410, may be further configured to be capable of positioning the in-flight refueling boom 114 relative to a known fixed point on a given second aircraft 120 shown in the image 510 such that the controller 111 may further be configured to align the in-flight refueling boom 114 with the refueling aperture 124 of the second aircraft 120.

Therefore, the controller 111 may determine a horizontal vector 530 and a vertical vector 520 from the center point 515 of the image 510 to a center point of the refueling receptacle 126. The controller 111 may be configured, for instance, to determine a center point of the refueling receptacle 126 (or a refueling aperture 124 defined therein, based, for instance, on a catalog of reference digital images of refueling receptacles 126 carried by various aircraft (as described above) that may be stored, for instance, in a memory device operably engaged with the controller 111. In other embodiments, the controller 111 may be configured to detect a unique known point on the second aircraft 120, by, for instance, matching a raster image 510 generated by an imaging device 410 to a stored image of a unique known point on the second aircraft 120 (such as for instance the structure of the refueling receptacle 126 (which may, in some instances, be a UARSI)). Thus, the controller 111 may generate and/or call up (from the memory device) positioning vectors 520, 530 from the unique known point to a center point of the refueling aperture 124 defined in a fuselage of the second aircraft 120. Furthermore, the controller 111 may be configured to position the in-flight refueling boom 114 using the positioning vectors 520, 530 generated by digitizing (e.g. rasterizing) an image 510 captured by the imaging device 410 such that the controller 111 may further be capable of positioning the in-flight refueling boom 114 into substantial alignment with the refueling receptacle 126 such that the controller 111 may further (in some cases, automatically) extend the extendable nozzle 116 telescopically from the in-flight refueling boom 114 so as to engage the refueling receptacle 126 carried by the second aircraft.

According to some other embodiments, the controller 111 of the in-flight refueling system and alignment system of the present invention may be further configured to continuously "track" the position of the refueling receptacle 126 carried by the second aircraft 120. For instance, the controller 111 may communicate with the imaging device 410 so as to produce a series of images that are consistently updated such that new positioning vectors 520, 530 may be constantly generated and utilized by the controller 111 such that the controller 111 may continuously re-position the in-flight refueling boom 114 in substantial alignment with the refueling receptacle 126 carried by a second aircraft. The controller 111, as stated above, may comprise one or more microprocessors or other computing devices suitable for continuously updating the positioning vectors 520, 530 based on a continuously updated raster image 510 provided by, for instance, the imaging device 410. Furthermore, the controller 111, may, in response to the positioning vectors 520, 530 may make continuous adjustments to the position of the in-flight refueling boom 114 relative to the in-flight refueling boom such that the in-flight refueling boom 114 and the refueling receptacle 126 may be substantially in alignment for a period long enough such that the extendable nozzle 116 may extend and engage the refueling aperture 124 defined in the refueling receptacle 126 carried by the second aircraft 120. For instance, in some in-flight refueling operations, using conventional boom in-flight refueling systems, the extendable nozzle 116 may, in some cases, extend about 10–12 feet telescopically from the in-flight refueling boom 114 at a speed of about 1 to 4 feet per second (as generally shown in FIG. 1) in order to contact the refueling receptacle 126 carried by a second aircraft 120. Thus, if the second aircraft 120 has a zero velocity relative to the first aircraft 110, the in-flight refueling boom 114 must remain in substantial alignment with the in-flight refueling receptacle 126 carried by the second aircraft 120 for a period of about 3 to 12 seconds in order for the extendable nozzle 116 to extend and engage the refueling receptacle 126 carried by the second aircraft 120.

Thus, embodiments of the in-flight refueling system and alignment system of the present invention may provide an imaging device 410 in communication with a controller 111 suitably configured to maintain the substantial alignment of the in-flight refueling boom 114 with the refueling receptacle 126 carried by the second aircraft 120. Furthermore, one skilled in the art will appreciate that embodiments of the present invention may also be suitable for maintaining the substantial alignment of the in-flight refueling boom 114 with the refueling receptacle 126 during the in-flight refueling operation and after the initial engagement of the extendable nozzle 116 with the refueling receptacle 126 carried by the second aircraft. As such, embodiments of the present invention may aid in positioning the in-flight refueling boom 114 during the transfer of fuel such that the in-flight refueling system and alignment system embodiments of the present invention may compensate for small movements of the second aircraft relative to the position of substantial alignment with the in-flight refueling boom 114. Such small movements may be common in in-flight refueling operations wherein the operator of the second aircraft is inexperienced in refueling via an in-flight refueling operation or wherein the operator of the second aircraft is non-existent and/or positioned remotely such as in cases where the second aircraft 120 is an unmanned aircraft (UAV).

According to some embodiments of the in-flight refueling system and alignment system of the present invention, the imaging device 410 may be operably engaged with an end of the in-flight refueling boom 114 along with an alignment device 210, comprising, for instance, receiver devices 210*a*, 210*b* configured to receive a signal emitted by complementary locator devices 310*a*, 310*b* disposed substantially adjacent to the refueling aperture 124 so as to be configured to emit a signal along an axis of alignment such that if the complementary receiver devices 210*a*, 210*b* are capable of receiving the signal, then the in-flight refueling boom 114 is substantially aligned with the refueling receptacle 126 as shown generally in FIG. 1. Thus, the imaging device 410, and the receiver devices 210*a*, 210*b* may be configured to communicate with the controller 111 of the present invention so as to both maintain substantial alignment of the in-flight refueling boom 114 with the refueling receptacle 126 carried by the second aircraft 120, and continuously check the maintenance of alignment via communication with the receiver devices 210*a*, 210*b*. As such, the receiver devices 210*a*, 210*b* and the imaging device 410 may provide complementary signals to the controller 111 such that proper substantial alignment is maintained and redundantly checked and updated during the course of an in-flight refueling operation. Similarly, in some embodiments, the imaging device 410 (which may be operably engaged with an end of the in-flight refueling boom 114) may be configured to be in communication with the controller 111 so that the controller 111 may, in turn, generate positioning vectors 520, 530 so as to position the in-flight refueling boom into substantial alignment with the refueling receptacle 126 carried by a second aircraft 120. Further, the receiver devices 210*a*, 210*b* may further be configured to detect a signal emitted from, for instance complementary locator devices 310*a*, 310*b* carried by the second aircraft wherein the detection of the signal may indicate alignment of the in-flight refueling boom 114 with the refueling receptacle 126 and wherein the signal may be communicated to the controller 111 such that the controller 111 may, in response to the signal received by the receiver devices 210*a*, 210*b*, automatically extend the extendable nozzle 116 to engage the refueling receptacle 126 so as to initiate an in-flight refueling operation. Thus, the imaging device 410, receiver devices 210*a*, 210*b*, and controller 111 may be in communication so as to control the in-flight refueling boom 114 such that the in-flight refueling boom 114 is not only in substantial alignment with the refueling receptacle 126 but also maintained in substantial alignment therewith during the extension of the extendable nozzle 116 for engagement with the refueling receptacle 126 carried by the second aircraft 120. As such, in some advantageous embodiments, such as shown generally in FIG. 4, the components of the in-flight refueling system and alignment system of the embodiments of the present invention may communicate so as to substantially automate both the alignment and extension aspects of an in-flight refueling operation.

Also as shown in FIG. 4, a range finder device 412 may be provided as a component of the in-flight refueling system and alignment system embodiments of the present invention where the range finder device 412 may comprise one or more range finder devices 412 carried by the tanker aircraft 110, such as by being disposed on an end of the in-flight refueling boom 114 and configured to be in communication with the controller 111. The range-finding device 412 may be further configured to determine a distance between an end of the in-flight refueling boom 114 and the refueling receptacle 126 carried by a second aircraft 126 and provide the distance to the controller 111 such that the controller 111 may be further configured to be capable of receiving the distance and extending the extendable nozzle 116 to at least that distance (assuming the measured distance is within a range of extension of the extendable nozzle 116) in response to the distance, so as to engage the refueling receptacle 126. In some embodiments, the controller 111 may be configured to calculate the distance between an end of the in-flight refueling boom 114 and the refueling receptacle 126 using, for instance, a digitized raster image 510 of the refueling receptacle 126 provided by an imaging device 410. However, in some advantageous embodiments, a range finder device 412 may be also provided to supplement the positioning information that may be provided to the controller 111 and/or an operator of the in-flight refueling system as described above in relation to various embodiments of the in-flight refueling system and alignment system of the present invention. The range finder device 412 may further comprise various devices suitable for determining, for instance, a straight-line distance between an end of the in-flight refueling device 114 and the refueling receptacle 126 carried by a second aircraft 120 such that a distance through which the controller 111 must extend the extendable nozzle 116 in order to engage a refueling aperture 124 defined in the refueling receptacle 126, may be determined. For instance, the range finding device 412 may comprise a laser range finder, a range finder using sound wave reflection, a radar system, a visible light reflection system, and infra-red range finding system, and/or other range finding devices suitable for attachment to an end of the in-flight refueling boom 114 and for determining a distance between the end of the in-flight refueling boom 114 and a refueling receptacle 126 substantially in alignment therewith. The range finding device 412 may also be in communication with the controller 111 so as to provide range information, via, for instance, an output device operably engaged with the controller 111, to an operator of the in-flight refueling system such that the operator may monitor the range between a second aircraft 120 and the in-flight refueling boom 114 so as to aid in the avoidance of collisions between the in-flight refueling boom 114 and the second aircraft 120.

Furthermore, according to some embodiments of the in-flight refueling system and alignment system of the present invention, the controller 111 may further comprise and/or be operably engaged with an output device (as described generally above), such as a high-resolution video monitor and/or numerical displays suitable for providing the image 510 of the refueling receptacle 126 relative to the in-flight refueling boom 114 as well as the positioning vectors 520, 530 that may be produced by the controller 111 to position the in-flight refueling boom 114 in substantial alignment with the in-flight refueling device 126 carried by the second aircraft 120. In addition, the output device may be further configured to provide a distance between the in-flight refueling boom 114 and the refueling receptacle 126, provided by, for instance, a range finding device 412 that may be included according to some embodiments of the in-flight refueling system and alignment system. Thus, an operator of the in-flight refueling system may monitor the substantially automated in-flight refueling system and alignment system of the present invention to ensure that the systems are working safely and properly to carry out the in-flight refueling operation. Furthermore, as discussed above, the controller 111 may further comprise a manual override control such that the operator may take over control of the positioning of the in-flight refueling boom 114 via the airfoils 118, the extension of the extendable nozzle 116, and/or other control parameters related to the in-flight refueling operation. Accordingly, the controller 111 and, in some embodiments, an output device operably engaged therewith, may be positioned within the fuselage of the tanker aircraft near an in-flight refueling system control station where, for instance, an operator of the in-flight refueling system may be stationed. In some cases the in-flight refueling system control station (and controller 111 positioned therein) may be located in a remote aerial refueling operating (RARO) station positioned near the forward end of the fuselage of the tanker aircraft 110. In other embodiments, the controller 111 may be located in an aft portion of the fuselage of the tanker aircraft 110 (as shown, for instance, in FIG. 1).

The embodiments of the in-flight refueling system and alignment system of the present invention may comprise a variety of optical, electronic, computer, transducer, imaging, digitizing, and electromechanical devices such as, for instance, the receiver devices 210*a*, 210*b* that may be included as part of an alignment device 210, the imaging device 410, the controller 111, the range finding device 412, and electromechanical devices and/or connections configured to carry signals from the controller 111, and/or a manual override control operably engaged therewith, to the airfoils 118 used to actuate the positioning of the in-flight refueling boom 114 during an in-flight refueling operation. According to various embodiments, as described more fully above, these various devices may be in communication with each other so as to substantially automate the in-flight refueling operation between a first aircraft 110 and a second aircraft 120. Communication between these devices may occur via a variety of communication devices and methods, such as, for instance via hard wired connections to for instance, printed circuit boards and/or integrated circuits, wireless methods, optical signal transfer methods (such as, for instance, fiber-optic methods and devices), and or other devices or methods suitable for establishing communication between the various sensors, devices, mechanisms, and controllers of the in-flight refueling system and alignment system of the present invention.

Referring again to FIG. 1 a method for facilitating an in-flight refueling operation between a first aircraft 110 adapted to carry an in-flight refueling boom 114 having an extendable nozzle 116 being capable of extending therefrom and a second aircraft 120 carrying a refueling receptacle 126 is described. Some embodiments of the method of the present invention comprise determining that an extendable nozzle 116 configured to extend from the in-flight refueling boom 114, is substantially in alignment with the refueling receptacle 126; and indicating that the in-flight refueling boom 114 is substantially in alignment with the refueling receptacle 126 (to, for instance, a controller 111 operably engaged with the in-flight refueling boom 114) such that the subsequent extension of the extendable nozzle 116 will engage the refueling receptacle 126. Other method embodiments may further comprise positioning the in-flight refueling boom 114, using the controller 111, such that the in-flight refueling boom 114 is substantially in alignment with the refueling receptacle 126.

Referring to FIGS. 4 and 5, other method embodiments of the present invention may further comprise capturing an image 510 of the refueling receptacle 126 (using, for instance, an imaging device 410, wherein the imaging device 410 may be disposed on an end of the in-flight refueling boom 114 as described above and shown generally in FIG. 4); and positioning of the in-flight refueling boom 114 substantially into alignment with the refueling receptacle 126 at least partially based on the image 510 captured by the imaging device. In yet another advantageous embodiment, the method of the present invention may further comprise determining a distance between the in-flight refueling boom 114 and the refueling receptacle 126 (using, for instance, a range-finder device 412); and extending of the extendable nozzle 116 to engage the refueling receptacle 126 based at least partially on the distance determined between the in-flight refueling boom 114 and the refueling receptacle 126.

Referring again to FIGS. 2–3, the indicating step of the method of the present invention may comprise: emitting a signal (from, for instance, a locator device 310*a*, 310*b*, wherein the locator device or devices may be disposed substantially adjacent to the refueling aperture 124 as shown in FIG. 3) carried by the second aircraft 120; and receiving the signal at the first aircraft 110 (using a receiver device 210*a*, 210*b* disposed on, for instance, an end of the in-flight refueling boom 114 as shown generally in FIGS. 1–2), wherein the reception of the signal by the receiver device 210*a*, 210*b* is indicative of substantial alignment between the in-flight refueling boom 114 and the refueling receptacle 126.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An in-flight refueling system comprising:

an in-flight refueling boom adapted to be carried by a first aircraft and comprising an extendable nozzle capable of extending therefrom, the extendable nozzle being adapted to engage a refueling receptacle carried by a second aircraft;

an imaging device operably engaged with the in-flight refueling boom and configured to capture an image of the refueling receptacle;

an alignment device operably engaged with the in-flight refueling boom and configured to determine and indicate alignment of the in-flight refueling boom with the refueling receptacle carried by the second aircraft by receiving a signal emitted by the second aircraft such that extension of the extendable nozzle will engage the refueling receptacle; said second aircraft comprising a locator device configured to emit said signal; and a controller operably engaged with the in-flight refueling boom and configured to be in communication with the alignment device and the imaging device, the controller further configured to be capable of receiving the image of the refueling receptacle and positioning the in-flight refueling boom in response to the image and stabilizing the in-flight refueling boom such that the in-flight refueling boom is in alignment with the refueling receptacle.

2. An in-flight refueling system according to claim 1, wherein the controller is further configured to extend the extendable nozzle to engage the refueling receptacle while the in-flight refueling boom is in alignment with the refueling receptacle.

3. An in-flight refueling system according to claim 2, further comprising a range-finding device operably engaged with the in-flight refueling boom and configured to be in communication with the controller, the range-finding device being further configured to determine a distance between the in-flight refueling boom and the refueling receptacle and provide the distance to the controllers the controller being further configured to be capable of receiving the distance and extending the extendable nozzle in response to the distance, so as to engage the refueling receptacle.

4. An in-flight refueling system according to claim 2, wherein, and the alignment device further comprising a receiver device configured to be capable of receiving the signal, reception of the signal by the receiver device being indicative of alignment between the in-flight refueling boom and the refueling receptacle, the alignment device being responsive to the signal so as to direct the controller to extend the extendable nozzle to engage the refueling receptacle.

5. An in-flight refueling system according to claim 4, wherein the signal is selected from the group consisting of:

a magnetic field;

a laser beam;

a light beam;

an infrared light beam; and combinations thereof.

6. An alignment system adapted to facilitate the engagement of an extendable nozzle extending from an in-flight refueling boom carried by a first aircraft with a refueling receptacle carried by a second aircraft, the alignment system comprising:

an imaging device operably engaged with the in-flight refueling boom and configured to capture an image of the refueling receptacle; said second aircraft comprising a locator device configured to emit said signal; and an alignment device operably engaged with the in-flight refueling boom and configured to determine and indicate alignment of the in-flight refueling boom with the refueling receptacle carried by the second aircraft by receiving a signal emitted by the second aircraft such that extension of the extendable nozzle will engage the refueling receptacle; and a controller operably engaged with the in-flight refueling boom and configured to be in communication with the alignment device and the imaging device, the controller further configured to be capable of receiving the image of the refueling receptacle and positioning the in-flight refueling boom in response to the image and stabilizing the in-flight refueling boom such that the in-flight refueling boom is in alignment with the refueling receptacle.

7. An alignment system according to claim 6, wherein the controller is further configured to extend the extendable nozzle to engage the refueling receptacle while the in-flight refueling boom is in alignment with the refueling receptacle.

8. An alignment system according to claim 7, further comprising a range-finding device operably engaged with the in-flight refueling boom and configured to be in communication with the controller, the range-finding device being further configured to determine a distance between the in-flight refueling boom and the refueling receptacle and provide the distance to the controller, the controller being further configured to be capable of receiving the distance and extending the extendable nozzle in response to the distance so as to engage the refueling receptacle.

9. An alignment system according to claim 7, wherein, and the alignment device further comprising a receiver device configured to be capable of receiving the signal, reception of the signal by the receiver device being indicative of alignment between the in-flight refueling boom and the refueling receptacle, the alignment device being responsive to the signal so as to direct the controller to extend the extendable nozzle to engage the refueling receptacle.

10. An alignment system according to claim 6, wherein the signal is selected from the group consisting of:

a magnetic field;

a laser beam;

a light beam;

an infra-red light beam; and combinations thereof.

11. A method for facilitating an in-flight refueling operation between a first aircraft adapted to carry an in-flight refueling boom having an extendable nozzle being capable of extending therefrom and a second aircraft carrying a refueling receptacle, the method comprising:

capturing an image of the refueling receptacle;

determining that an extendable nozzle configured to extend from the in-flight refueling boom is in alignment with the refueling receptacle; generating a signal and emitting said signal from said second aircraft;

receiving said signal emitted by the second aircraft at the first aircraft, wherein the reception of the signal by the receiver device is indicative of alignment between the in-flight refueling boom and the refueling receptacle;

positioning the in-flight refueling boom such that the in-flight refueling boom is in alignment with the refueling receptacle at least partially based on the image; and stabilizing the in-flight refueling boom such that the in-flight refueling boom is in alignment with the refueling receptacle.

12. The method according to claim 11, further comprising extending the extendable nozzle to engage the refueling receptacle while the in-flight refueling boom is in alignment with the refueling receptacle.

13. The method according to claim 12, further comprising:

determining a distance between the in-flight refueling boom and the refueling receptacle; and extending the extendable nozzle to engage the refueling receptacle based at least partially on the distance between the in-flight refueling boom and the refueling receptacle.

* * * * *